Patented Nov. 25, 1930

1,782,621

UNITED STATES PATENT OFFICE

HANS JORDAN, OF BERLIN-STEGLITZ, GERMANY, ASSIGNOR TO CHEMISCHE FABRIK AUF ACTIEN (VORM. E. SCHERING), OF BERLIN, GERMANY

METHOD OF PRODUCING PRODUCTS OF HYDROGENATION OF ALKYLATED PHENOLS

No Drawing. Application filed July 12, 1926, Serial No. 122,032, and in Germany July 4, 1925.

My invention refers to the production of products of hydrogenation of alkylated phenols and more especially to the production of alkylated cyclo hexanols.

I have found that by treating a product of condensation of a ketone and a phenol having the formula

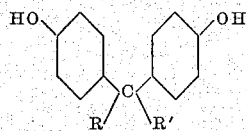

wherein R and R' are alkyl or aryl radicals, with hydrogen in the presence of a catalyst in such manner that the molecule of the condensation product is split up at the point where the ketone connects the phenol radicals, and hydrogenating the split products further, derivatives of cyclo hexanol are obtained having the formula

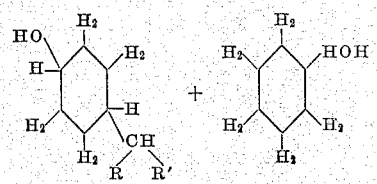

Preferably the hydrogenation of the split products is continued until fourteen hydrogen atoms have been fixed.

I have further found that the splitting and the hydrogenation of the split products can be effected in a particularly effective manner in the presence of a nickel catalyst containing manganese, and that the operation is preferably carried out at and above a temperature of about 170° C.

In practising my invention I prefer proceeding for instance as follows:

Example 1

100 parts by weight of p-dihydroxydiphenyl dimethyl methane are treated at 170° C. with hydrogen under pressure in the presence of two parts of a nickel catalyst containing manganese until 14 hydrogen atoms have been fixed. If the mixture resulting in this reaction is subjected to fractional distillation, cyclo hexanol and 4-isopropyl cyclo hexanol can be recovered.

Example 2

By treating 4-dihydroxy-3-dimethyl diphenyl dimethyl methane with hydrogen as described with reference to Example 1, there are obtained 1-methyl cyclo hexanol and 1-methyl-4-isopropyl cyclo hexanol.

Example 3

By treating p-dihydroxydiphenyl methyl ethyl methane as described with reference to Example 1, there is obtained 4-isobutyl cyclo hexanol and some cyclohexanol.

Various changes may be made in the details of the operation and particularly in the proportions of the ingredients without departing from the invention or sacrificing the advantages thereof.

I claim:—

1. The method of producing products of hydrogenation of alkylated phenols, comprising subjecting a product of condensation of a ketone and a phenol having the formula

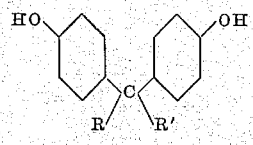

wherein R and R' are alkyl or aryl radicals to treatment at a temperature of at least 170° C. with hydrogen in the presence of a mixed hydrogenation catalyst in such manner that the molecule of the compound is split up at the point where the ketone connects the phenol radicals, and simultaneously hydrogenating the split products further.

2. The method of producing products of hydrogenation of alkylated phenols, comprising subjecting a product of condensation of a ketone and a phenol having the formula

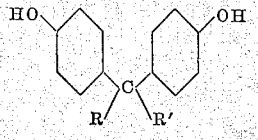

wherein R and R' are alkyl or aryl radicals to treatment at a temperature of at least 170° C.

with hydrogen in the presence of a mixed hydrogenation catalyst containing manganese in such manner that the molecule of the compound is split up at the point where the ketone connects the phenol radicals, and simultaneously hydrogenating the split products further.

3. The method of producing products of hydrogenation of alkylated phenols, comprising subjecting a product of condensation of a ketone and a phenol having the formula

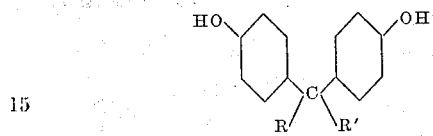

wherein R and R′ are alkyl or aryl radicals to treatment at a temperature of at least 170° C. with hydrogen in the presence of a nickel catalyst containing manganese in such manner that the molecule of the compound is split up at the point where the ketone connects the phenol radicals, and simultaneously hydrogenating the split products further.

4. The method of producing isopropyl cyclo hexanol comprising treating 100 parts by weight of p-dihydroxy diphenyl dimethyl methane in the presence of 2 parts of a nickel catalyst containing manganese at 170° C. with hydrogen under pressure, until fourteen hydrogen atoms have been fixed, and subjecting the product to fractional distillation.

In testimony whereof I affix my signature.

HANS JORDAN.